(No Model.)
F. VAN GERPEN.
SHADING PEN.
No. 580,939.          Patented Apr. 20, 1897.
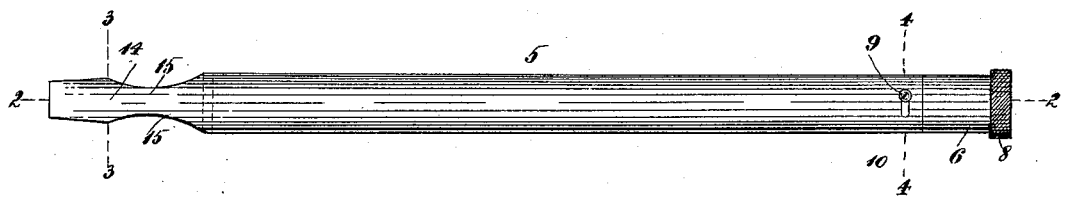
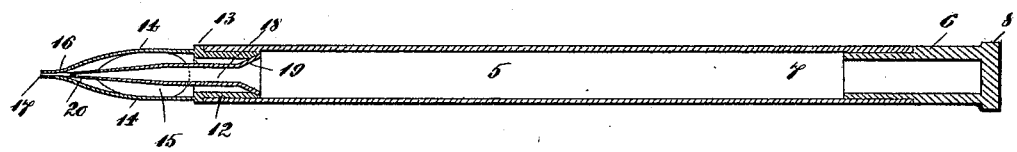
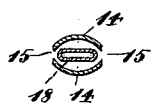 
WITNESSES
INVENTOR
Frederic Van Gerpen,
BY Edgar Tate & Co
ATTORNEYS

UNITED STATES PATENT OFFICE.

FREDERIC VAN GERPEN, OF NEW YORK, N. Y.

SHADING-PEN.

SPECIFICATION forming part of Letters Patent No. 580,939, dated April 20, 1897.

Application filed August 7, 1896. Serial No. 601,996. (No model.)

*To all whom it may concern:*

Be it known that I, FREDERIC VAN GERPEN, a subject of the Queen of Great Britain, and a resident of New York, in the county of New York and State of New York, have invented certain new and useful Improvements in Shading-Pens, of which the following is a specification, reference being had to the accompanying drawings, forming a part thereof, in which similar numerals of reference indicate corresponding parts wherever found throughout the several views.

This invention relates to shading-pens; and the object thereof is to provide an improved device of this class which is simple in construction and operation, a further object being to provide a fountain shading-pen which is adapted for use in almost any connection where such devices are required and by means of which almost any desired character of shading may be made.

The invention is fully disclosed in the following specification, of which the accompanying drawings form a part, in which—

Figure 1 is a side view of my improved shading-pen; Fig. 2, a longitudinal central section thereof on the line 2 2; Fig. 3, a transverse section of the pen proper on the line 3 3, and Fig. 4 a transverse section on the line 4 4.

In the practice of my invention I provide a tubular reservoir and holder 5, which is provided at one end with a tubular plug 6, having a reduced extension 7, which is adapted to fit into the end of the reservoir and holder and which is closed at its outer end and provided with a milled head, as shown at 8.

The reduced extension 7 of the tubular plug 6 is provided with a pin 9, which passes through a short transverse slot 10, formed in the end of the reservoir and holder, and the reduced extension of said plug is also provided with a small perforation, as shown at 11, which is designed to serve as an air-vent, and by turning the tubular plug said air-vent may be closed and opened whenever desired, it being understood that by turning the plug the perforation 11 will be brought into communication with the adjacent end of the slot 10 in the end of the holder and reservoir.

The opposite end of the holder and reservoir is provided with a short plug 12, which is detachably connected therewith and provided at its outer end with an annular flange or rim 13, and said plug 12 is also provided with two outwardly-directed plates 14, which are preferably formed integrally therewith and the sides of which are cut away to form elliptical openings 15, so as to increase the spring action of said plates, and said plates 14 between the central portions of said openings and the outer ends thereof are longitudinally convex in cross-section, as clearly shown in Fig. 3, said convex portion being carried outwardly almost to the ends of the said plates or to the point indicated by the reference-numeral 16 in Fig. 2, beyond which point the ends of the plates are flat and come almost together, so as to form the point of the pen, as shown at 17. I also provide a supplemental tube 18, provided with a conical or bell-shaped end 19, which is secured in the inner end of the short tube 12, and said tube projects concentrically through said short tube, and the side walls of the outer end thereof are flattened and gradually brought together at the outer end thereof, as shown at 20, and said outer end of the tube 18 extends almost to the point 16, where the ends of the side plates 14 come together.

The outer end of the tube 18 is provided with a narrow slit or opening between the side plates thereof, through which the ink flows, and the ink is discharged therefrom between the ends of the plates 14, as will be readily understood, and the ends of the said plates 14 are not in their normal position in contact, but in the operation of the pen the slight pressure applied to one of said plates will close or almost close the space between the same.

The ends or points of the plates 18 at 17 may be made of any desired width, and the operation will be readily understood from the foregoing description when taken in connection with the accompanying drawings and the following statement thereof.

The reservoir and holder 5 is filled with ink in the usual manner, and as long as the vent 11 is closed the ink will not flow through the tube 8, and whenever it is desired to use the pen the tubular plug 6 is turned so as to open the vent 11, and the manipulation of the pen will be understood by all those familiar with this class of devices.

The longitudinally-convex form of the plates 14 near their outer ends assists in securing the proper flow of the ink to the point of the pen, and my improved shading-pen is simple in construction and operation and perfectly adapted to accomplish the result for which it is intended, and the same is not liable to get out of order and thus necessitate frequent repairs.

It will also be understood that the separate parts of my improved pen may be detached and cleaned whenever desired, and it is evident that changes in and modifications of the construction herein described may be made without departing from the spirit of my invention or sacrificing its advantages.

Having fully described my invention, I claim as new and desire to secure by Letters Patent—

1. A shading-pen comprising a tubular holder and reservoir, one end of which is closed by a tubular plug which is provided with a milled head, and in connection with which and the end of said holder and reservoir, is an air-vent, the opposite end of the holder and reservoir being provided with a tube which is detachably connected therewith, and which is provided with two projecting side plates, the outer ends of which are brought together to form a shading-point, and the sides of which are cut away so as to give elasticity thereto, and said short tube being also provided with a supplemental tube, which is fixed concentrically therein, and the outer end of which projects to near the point where the side plates are brought together, and the end thereof being also flattened, substantially as shown and described.

2. A shading-pen, comprising a tubular holder and reservoir, one end of which is closed by a tubular plug, in connection with which and the end of said holder and reservoir, is an air-vent, the opposite end of the holder and reservoir being provided with a short tube, which is detachably connected therewith, and which is provided with two projecting side plates, the outer ends of which are brought together to form a shading-point, said short tube being also provided with a supplemental tube, which is fixed concentrically therein, and the outer end of which projects outwardly to the point where the side plates are brought together, and said outer end of said supplemental tube being also flattened, and the outer portion of the side plates adjacent to the point where the ends thereof are brought together being convex in cross-section, substantially as shown and described.

In testimony that I claim the foregoing as my invention I have signed my name, in presence of the subscribing witnesses, this 3d day of August, 1896.

FREDERIC VAN GERPEN.

Witnesses:
   W. W. HILL,
   CHARLES S. ROGERS.